US008350422B2

(12) United States Patent  (10) Patent No.: US 8,350,422 B2
Bradley et al.  (45) Date of Patent: Jan. 8, 2013

(54) ROTATING ELECTRICAL MACHINES

(75) Inventors: Stuart Ian Bradley, Leicester (GB); Graham Derek Le Flem, Warwickshire (GB)

(73) Assignee: Converteam Technology Ltd., Warwickshire (GB)

( * ) Notice: Subject to any disclaimer, the term of this patent is extended or adjusted under 35 U.S.C. 154(b) by 378 days.

(21) Appl. No.: 12/701,842

(22) Filed: Feb. 8, 2010

(65) Prior Publication Data

US 2010/0225121 A1 Sep. 9, 2010

(30) Foreign Application Priority Data

Feb. 11, 2009 (EP) ..................................... 09001871

(51) Int. Cl.
*H02K 5/24* (2006.01)

(52) U.S. Cl. ......................................................... 310/51

(58) Field of Classification Search .................... 310/51, 310/75 R, 90
See application file for complete search history.

(56) References Cited

U.S. PATENT DOCUMENTS

| 6,437,467 B1 * | 8/2002 | Schierling et al. .............. 310/51 |
| 6,448,674 B1 | 9/2002 | Schierling et al. |
| 2004/0104630 A1 * | 6/2004 | Denner et al. .............. 310/75 R |

FOREIGN PATENT DOCUMENTS

| DE | 102005031813 A1 | 1/2007 |
| DE | 102008023361 A1 | 12/2008 |

* cited by examiner

*Primary Examiner* — Nguyen N Hanh
(74) *Attorney, Agent, or Firm* — Eckert Seamans Cherin & Mellott, LLC; David C. Jenkins

(57) ABSTRACT

A torsional vibration damper is integrated into a rotating electrical machine. A rotatable assembly of the electrical machine includes a rotor core pack having a first end and a second end. The integrated torsional vibration damper consists of a torsional elastic coupling and a torsional elastic damper and provides mechanical damping. The integrated torsional vibration damper is mounted to the rotatable shaft of the electrical machine by a flange. The rotor core pack is mounted at the first end to the integrated torsional vibration damper by suitable structure members such as a mounting flange and is not fixedly mounted directly to the rotatable shaft. In the case where the rotor core pack is cooled by circulating coolant fluid (e.g. MIDEL) then the integrated torsional vibration damper may be a viscous damper that uses the coolant fluid as a viscous working fluid.

11 Claims, 4 Drawing Sheets

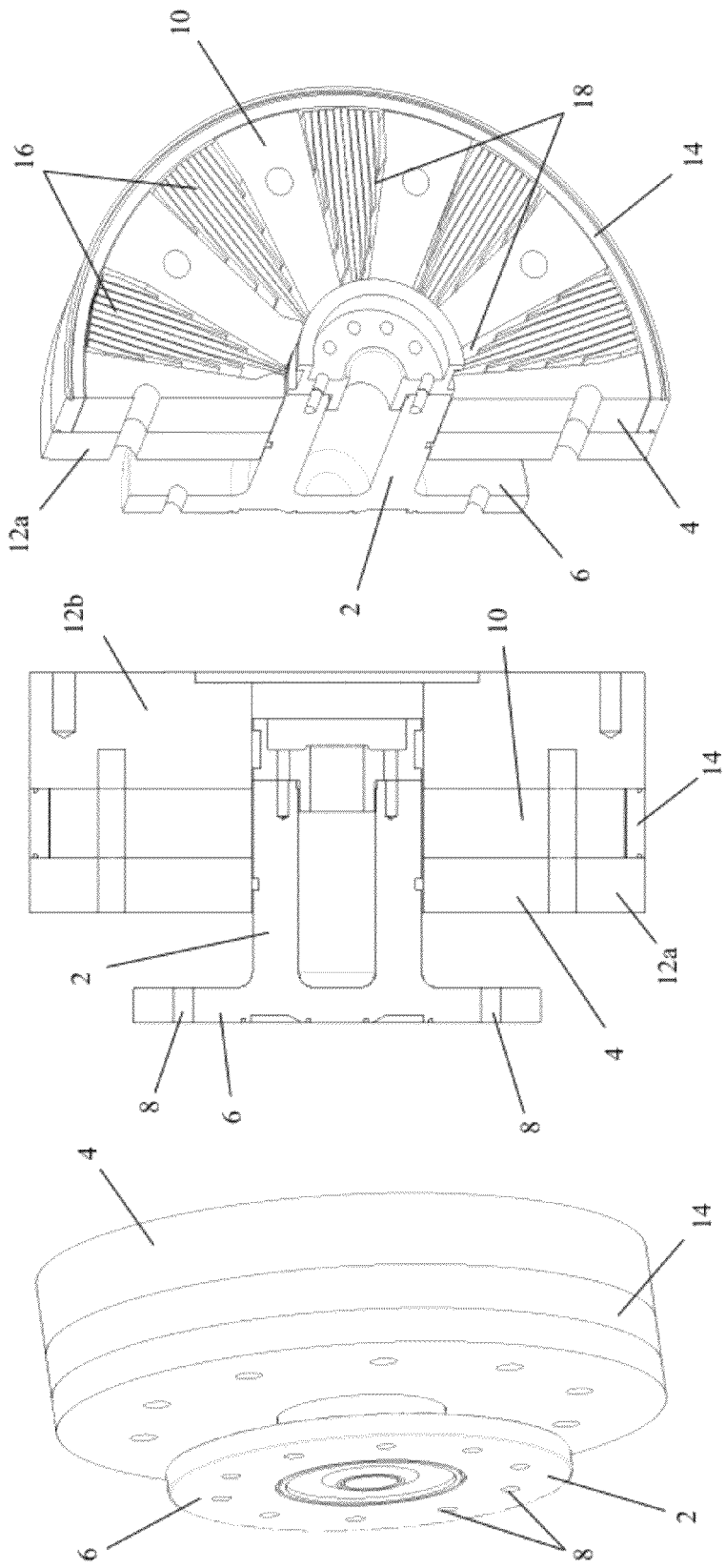

ROTATING ELECTRICAL MACHINES

CROSS REFERENCE TO RELATED APPLICATION

This application claims priority to European Patent Application No. 09001871.4 filed Feb. 11, 2009

FIELD OF THE INVENTION

The invention relates to rotating electrical machines such as motors and generators.

BACKGROUND OF THE INVENTION

Torsional vibration dampers (TVDs) are commonly used to provide mechanical damping in physically large generator sets where a torque is applied to the rotatable shaft of an electrical machine by an external device (prime mover) such as a diesel engine or turbine, for example. Such TVDs are used to prevent the build up of dangerous torsional vibration levels in the rotatable shaft of the electrical machine during start-up, shut-down and the normal operation of the generator set.

A stand-alone TVD includes a primary member that is driven by an output shaft of the prime mover and a secondary member that applies a torque to the rotatable shaft of the electrical machine. The primary and secondary members are elastically connected together by suitable spring sets so that the torque that is applied to the primary member by the output shaft of the prime mover is transferred through the spring sets to the secondary member. Buffers are often provided within the TVD to restrict the relative rotational movement between the primary and secondary members and hence prevent overloading and excessive deflection of the spring sets. Such conventional stand-alone TVDs are physically large, expensive to manufacture and install and add significantly to the overall length of the generator set. They can also suffer from misalignment problems.

In the case where the stand-alone TVD is a viscous damper then damping chambers formed in the body of the secondary member are filled with a viscous working fluid, typically engine oil that is circulated from the prime mover. The damping chambers are connected together by narrow passageways. Relative rotational movement between the primary and secondary members of the TVD forces the viscous working fluid through the passageways between the damping chambers and past the ends of the spring sets (e.g. leaf springs) to dampen torsional vibrations. The engine oil has a high operating temperature (about 80° C.) and often contains contaminant particles that can cause blockages, increase wear and reduce the reliability of the TVD.

SUMMARY OF THE INVENTION

The present invention improves on the known use of conventional stand-alone torsional vibration dampers (TVDs) by effectively integrating a TVD that provides mechanical damping within a rotating electrical machine. This results in a generator set or motor set that is significantly more physically compact and hence cheaper and easier to install. Other technical advantages arising from the integration of the TVD within the rotating electrical machine (e.g. performance optimisation arising from improved control of the mechanical damping provided by the TVD) are also discussed in more detail below.

More particularly, the present invention provides a rotating electrical machine (e.g. a motor or generator) comprising: a rotatable shaft, a rotor assembly (e.g. a rotor core pack) concentric with the rotatable shaft and having a first end and a second end, a rotatable shaft, and a viscous TVD that employs a viscous working fluid to provide mechanical damping, the TVD being mounted to the rotatable shaft, wherein the rotor assembly is mounted at the first end to the torsional vibration damper device and is not fixedly mounted directly to the rotatable shaft but is concentric with it.

It would be normal for a rotor core pack to be made of a series of laminations which are pressed together and shrunk onto the rotatable shaft. The laminations are typically formed from sheets of electrical grade steel with the laminations having an appropriate insulating substance e.g. a varnish, resin or other appropriate (organic or inorganic) compound applied thereto. In an operation to assemble such a rotor core pack the laminations are typically placed on a mandrel, pressed together at a suitably high pressure and then heated up and shrunk directly onto a pre-machined rotatable shaft. In the present invention, there is no need for such an assembly operation since the rotor assembly is specifically designed not to be fixedly mounted or secured directly to the rotatable shaft. Instead at least one end of a pre-formed rotor core pack is mounted to the TVD using suitable structural members.

The rotor assembly provides a rotating magnetic field and this can be generated by permanent magnets, superconducting windings with a suitable excitation power supply or conventional windings with slip rings or brushless excitation power supply, for example.

The rotor assembly is preferably mounted for rotation relative to a stator assembly. A stator winding may be received in slots provided in a surface of the stator assembly in a conventional manner.

In an embodiment where only a single TVD is provided at one end of the rotor assembly then a bearing is preferably provided between the rotor assembly and the rotatable shaft. Any suitable bearing can be used (e.g. roller, plan, polymer or composite bearings) and is preferably located axially between the rotor assembly and the rotatable shaft. The bearing may allow relative torsional rotation between the rotor assembly and the rotatable shaft and supports the rotor assembly in the radial and/or axial direction(s). Although the rotor assembly is supported by the bearing, it will be readily appreciated that the rotor assembly is still not fixedly mounted or secured directly to the rotatable shaft. Torque is therefore transferred from the rotatable shaft to the rotor assembly by means of the TVD and the structural members.

In an alternative "fully-floating" embodiment then a second TVD for providing mechanical damping is mounted to the rotatable shaft and the rotor assembly is mounted at the second end to the second TVD. In other words, the rotor assembly is mounted at both ends to the rotor assembly by a TVD. The TVDs can have the same or different construction depending on the circumstances. However, if the TVDs have a different construction then care must be taken to ensure that the rotor assembly remains properly balanced and aligned during start-up, shut-down and normal operation of the electrical machine.

The first end of the rotor assembly is preferably at the driven or driving end (DE) of the electrical machine. This is because it will normally be most useful in the embodiment where only a single TVD is provided for the TVD to be located between the driving shaft of the prime mover and the rotatable shaft (in the case of a generator set) or between the rotatable shaft and a driven load (in the case of a motor set). However, in some embodiments it may be possible for the first end of the rotor assembly to be at the non-driven or non-driving end (NDE) of the electrical machine.

The TVD will employ a viscous working fluid. If the rotating electrical machine is air-cooled then the viscous working fluid can be engine oil circulated from the prime mover of a generator set, for example. The engine oil can be filtered to remove any contaminant particles before being provided to the TVD. However, if the rotatable assembly has a coolant circuit through which a coolant fluid is circulated for cooling the rotor assembly (and/or the stator) then it is generally preferred that the viscous working fluid is the coolant fluid. The coolant circuit will preferably include means for cooling and filtering the coolant fluid. An example of a suitable coolant fluid is MIDEL and its equivalents, which is a proprietary transformer insulating fluid. The use of the coolant fluid as the viscous working fluid for the TVD is considered to be advantageous because of its lower operating temperature (about 40° C. as opposed to about 80° C. for engine oil) and the fact that it does not contain contaminant particles. The absence of any contaminant particles will reduce the amount wear in the TVD and increase its reliability. It has also been noted that MIDEL in particular has a significantly higher viscosity when it is cold and therefore provides enhanced damping during start-up as the electrical machine passes through various torsional resonances.

The mechanical damping provided by the TVD may be used in conjunction with any electrical damping of the rotor assembly.

The TVD may consist of a damper having a primary member adapted to be mounted to the rotatable shaft and a secondary member elastically connected to the primary member by one or more spring sets and adapted to be mounted to the first end of the rotor assembly. The primary member of the damper can be further adapted to be mounted to a driving shaft of a prime mover or a driven load.

The TVD may further consist of a coupling having a primary member adapted to be mounted to a driving shaft of a prime mover or a driven load and a secondary member elastically connected to the primary member by one or more spring sets. In this case, the primary member of the damper is further adapted to be mounted to the secondary member of the coupling.

The driving shaft of the prime mover may be the crankshaft of a diesel engine or the output shaft of a turbine, for example.

A rotating electrical machine with an integrated viscous TVD can be used as part of a generator set where a prime mover is adapted to apply a torque to the rotatable shaft of the electrical machine by means of the TVD. In a fully coupled embodiment using a single bearing rotor assembly then it may be possible to completely omit the engine flywheel and the engine base frame. Such an embodiment would require the electrical machine frame to match the rear face of block (RFOB) and supporting base frame of the prime mover. The TVD can be mounted to the rotatable shaft of the electrical machine and drive the rotor core pack by means of suitable structural members. The electrical machine may have a single bearing situated at the non-driven end of the rotatable shaft and a bearing associated with the prime mover would withstand axial and radial forces to provide proper axial location for the rotatable shaft. The electrical machine may also have bearings at both the driven and non-driven ends of the rotatable shaft.

A rotating electrical machine with an integrated viscous TVD can also be used as part of a motor set where a driven load is adapted to receive a torque from the rotatable shaft of the electrical machine by means of the TVD. Such a motor set may be useful for applications with high transients like steel or cement mills or where a very smooth drive is required (e.g. quiet marine propulsion).

The present invention further provides a method of controlling a viscous TVD mounted to a rotatable shaft of a rotating electrical machine, the method comprising the step of controlling the flow of viscous working fluid within the TVD to alter the level of damping that is applied to the rotatable shaft. The flow rate of viscous working fluid within the TVD, and in particular through the damping chambers and connecting passageways past any spring sets, can be altered by using any suitable flow restriction valves (which may be located internally or externally of the electrical machine), control orifices or actuators employing electronic or mechanical control. For example, flow restriction valves can be controlled electronically by a damping controller that may form part of, or be integrated with, a prime mover controller or electrical machine controller that controls the overall operation of the prime mover or electrical machine, respectively. The flow restriction valves can also be controlled mechanically using thermostatic, centrifugal, pressure and surge controllers.

Controlling the level of damping that is applied to the rotatable shaft by the TVD is expected to be particularly advantageous during transient events such as start-up and shut-down of the electrical machine. For example, a high level of damping can be applied by the TVD during start-up and shut-down and a low level of damping can be applied during normal operation of the electrical machine, or at times when a high level of damping is not expected to be needed. Moving from a high flow rate of viscous working fluid to a low flow rate will result in a change in the level of damping from low damping to high damping or vice versa. Flow restriction valves can be opened to provide a high flow rate of viscous working fluid during normal operating conditions and hence low level damping. Similarly, flow restriction valves can be closed as required to provide a low flow rate of viscous working fluid and hence high level damping. It will be readily appreciated that any particular flow rate can be selected by opening or closing the flow restriction valves to provide a particular damping level.

Simple damping control may be based on the operating characteristics of the electrical machine (e.g. speed or load characteristics) and/or any associated machinery. More advanced active damping control may employ model-based algorithms or adaptive-closed loop control, for example.

The frequency response of the rotatable shaft can be altered by controlling the flow of viscous working fluid within the TVD and/or using the TVD structure as a tuned mass damper (sometimes called an active mass damper). This enables the dynamic structural response of the rotatable shaft to be altered to control critical speed frequencies which cause high vibration levels and hence machine fatigue. To form a tuned mass damper the TVD is preferably mounted to the rotatable shaft of the electrical machine by a suitable spring and damper mechanism where the spring rate and the mass of the TVD are chosen to match one or more of the critical speed frequencies. Damping between the TVD and the rotatable shaft would be provided to restrict the response magnitude.

The radial stiffness of the TVD and damping rates will be chosen to match the TVD supported mass and critical frequencies of the rotatable shaft, thus providing the correct dynamic response to reduce the vibrations in the rotatable shaft. A suitable stiffness can be provided by using a suitable radial spring design, such as an elastomeric design, a cantilever spring or a combination of both.

BRIEF DESCRIPTION OF THE DRAWINGS

Exemplary embodiments of the invention will now be described, with reference to the accompanying drawings, in which:

FIGS. 1 to 3 are cross sectional views of a known torsional vibration coupling;

DETAILED DESCRIPTION OF THE PREFERRED EMBODIMENTS

Figure 6:
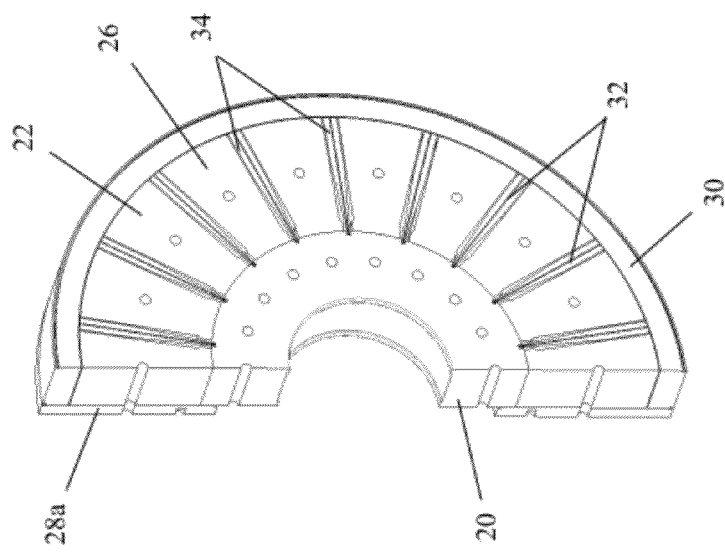
FIGS. 4 to 6 are cross sectional views of a known torsional vibration damper.

With reference to FIGS. 1 to 3, a known torsional elastic coupling of the type supplied by Geislinger GmbH of Hallwanger Landesstrasse 3, A-5300 Hallwang/Salzburg, Austria ("Geislinger") includes a primary member 2 and a secondary member 4 that are elastically connected together by spring packs. The primary member 2 includes a flange part 6 with a series of circumferentially spaced openings 8 that enable it to be mechanically secured to the crankshaft of a diesel engine, for example.

The secondary member 4 consists of an intermediate part 10 that is located between a pair of end plates 12a, 12b and a radially outer clamping ring 14. A series of circumferentially-spaced steel spring packs 16 (e.g. leaf springs) are located in damping chambers 18 provided the intermediate part 12. The spring packs 16 are clamped by the intermediate part 10 at their radially outer ends and their radially inner ends are located in carefully machined grooves or slots (not shown) provided in the primary member 2. The damping chambers 18 are filled with viscous working fluid, typically engine oil that is circulated from the diesel engine. The damping chambers 18 are connected together by narrow passageways that are located adjacent the outer surface of the primary member 2. Relative movement between the primary and secondary members 2, 4 causes the spring packs 16 to bend and forces the viscous working fluid from one damping chamber to another to dampen torsional vibrations.

Figure 5:
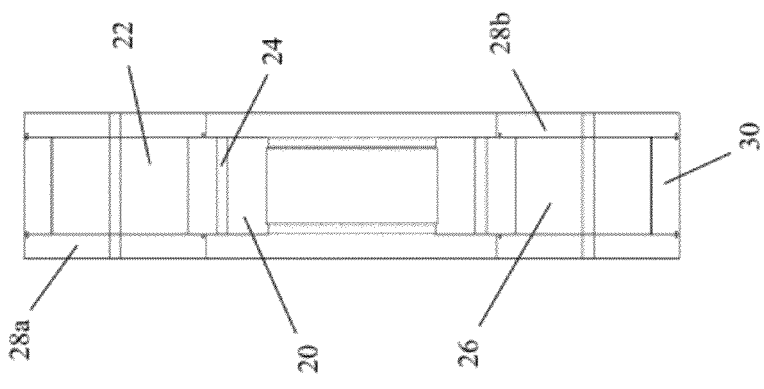
Figure 4:
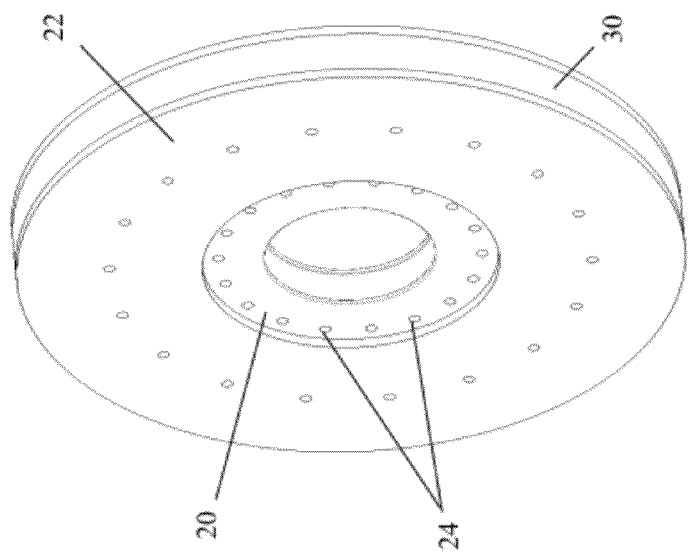

With reference to FIGS. 4 to 6, a known torsional elastic damper of the type supplied by Geislinger includes a primary member 20 and a secondary member 22 that are elastically connected together by spring packs. Although the damper and the coupling have different applications, they have a similar design. One difference is that the primary member 20 of the damper is adapted to be mechanically secured to either input or output components. The primary member 20 includes a series of circumferentially spaced openings 24 that enable it to be mechanically secured to the secondary member 4 of the coupling or directly to the crankshaft of a diesel engine, for example, in a situation where the damper is used in isolation.

The secondary member 22 consists of an intermediate part 26 that is located between a pair of end plates 28a, 28b and a radially outer clamping ring 30. A series of circumferentially-spaced steel spring packs 32 (e.g. leaf springs) are located in damping chambers 34 provided the intermediate part 26. The spring packs 32 are clamped by the intermediate part 26 at their radially outer ends and their radially inner ends are located in carefully machined grooves or slots (not shown) provided in the primary member 20. The damping chambers 34 are filled with viscous working fluid, typically engine oil that is circulated from the diesel engine. The damping chambers 34 are connected together by narrow passageways that are located adjacent the outer surface of the primary member 20. Relative movement between the primary and secondary members 20, 22 causes the spring packs 32 to bend and forces the viscous working fluid from one damping chamber to another to dampen torsional vibrations.

In both cases, the damping is determined by the passageways which connect the damping chambers.

In a known arrangement, the torsional elastic coupling and damper may be used in combination and mounted between the crankshaft of a diesel engine, for example, and the rotatable shaft of a rotating electrical machine. More particularly, the flange part 6 of the primary member 2 of the coupling is mechanically secured to the crankshaft and the secondary member 4 of the coupling is mechanically secured to the primary member 20 of the damper. The primary member 20 of the damper is mechanically secured to the driven end of the rotatable shaft by means of a flange. Torque from the crankshaft is transferred to the driven end of the rotatable shaft by means of the coupling and damper, which both serve to dampen any torsional vibrations in the rotatable shaft. The secondary member 22 of the damper is not mechanically secured to any other component and acts as a force/torque transfer mechanism to the spring sets.

Figure 7:
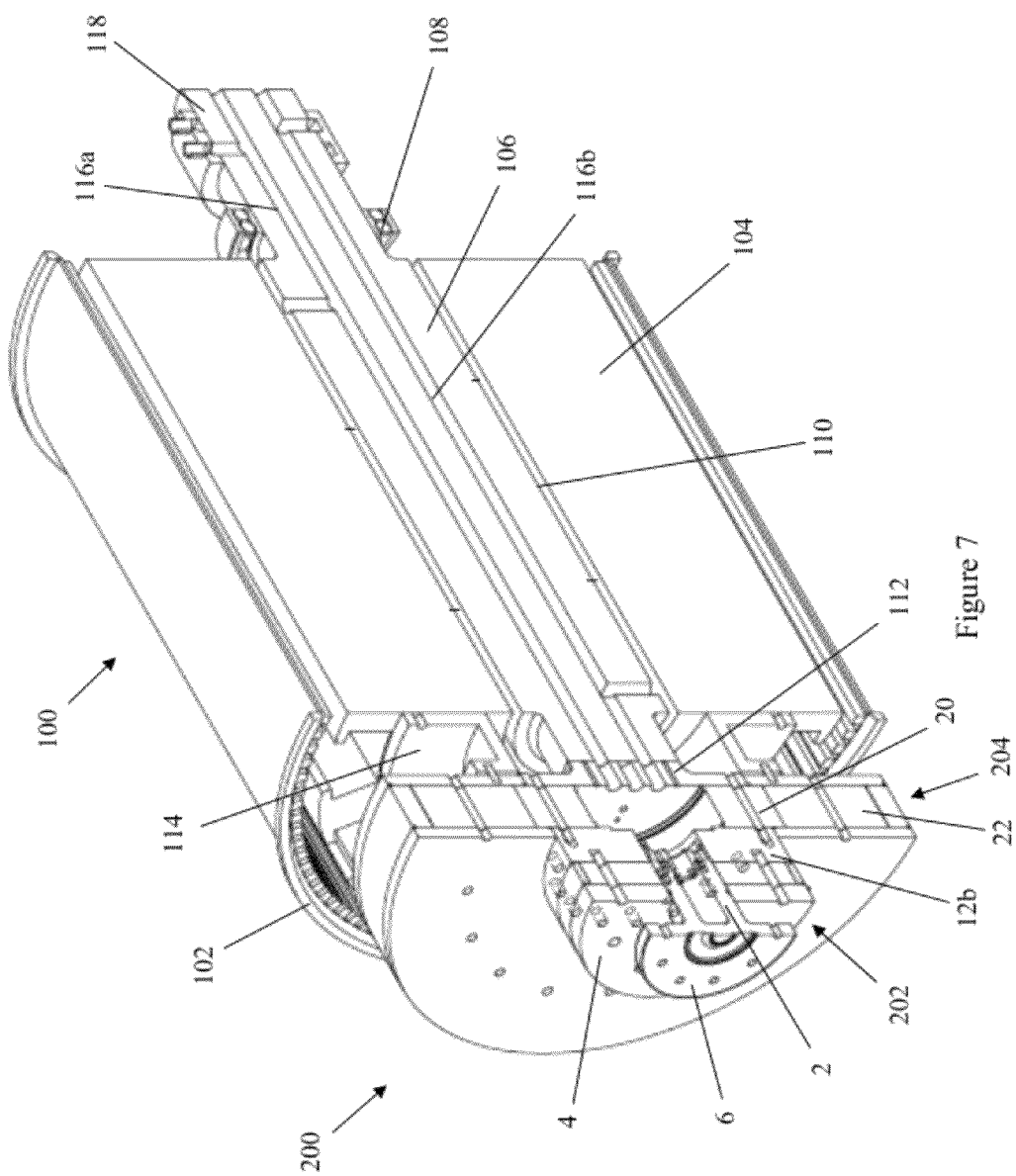
FIG. 7 is a cross sectional view of a torsional vibration damper (TVD) integrated with a rotating electrical machine in accordance with the present invention.
Figure 8:
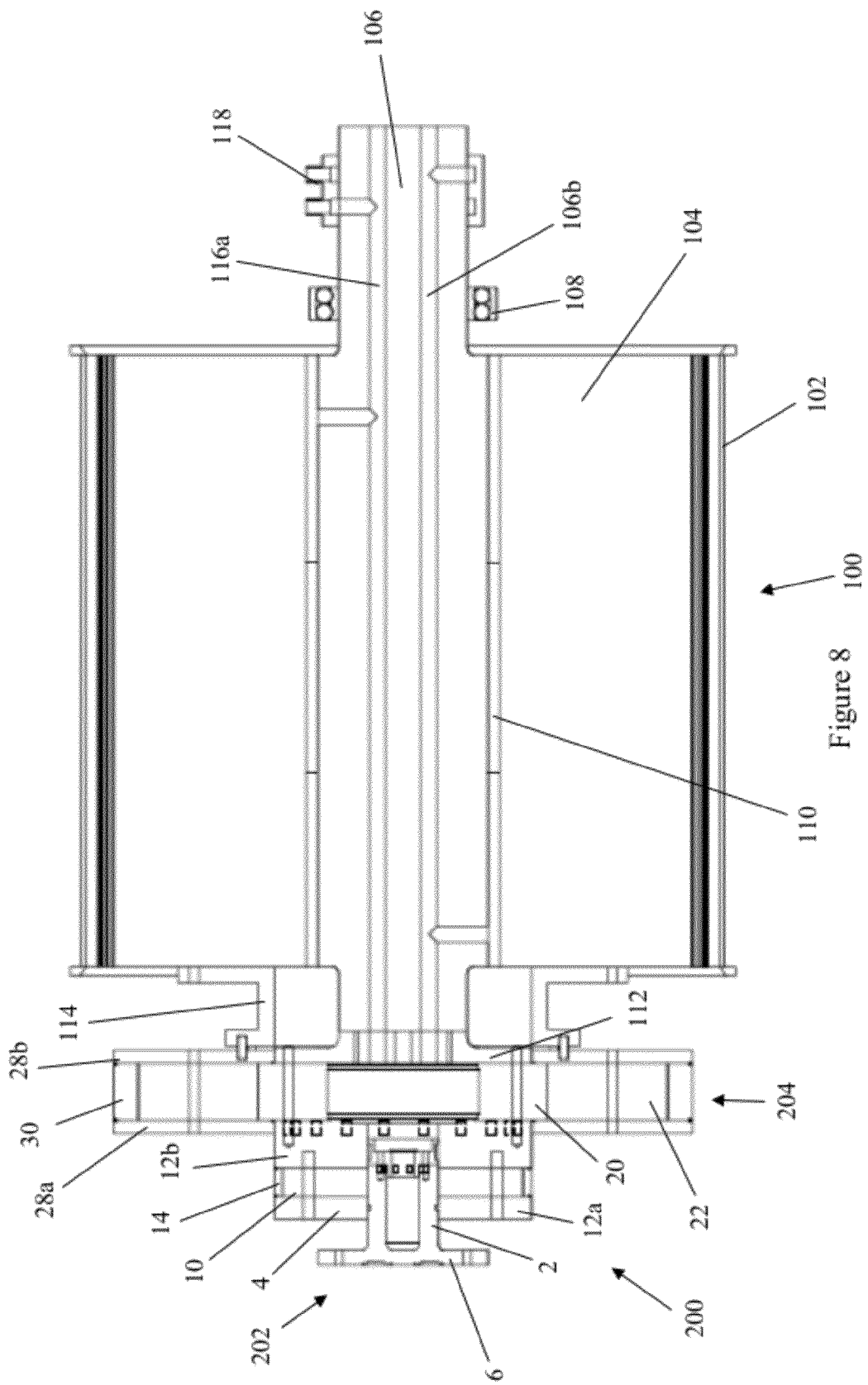
FIG. 8 is a cross sectional view of the integrated TVD and rotating electrical machine of FIG. 7.

FIGS. 7 and 8 show how a torsional elastic coupling and damper can be integrated into a rotating electrical machine in accordance with the present invention.

A generator 100 consists of a stator assembly 102, a rotor assembly 104 (e.g. a rotor core pack) and a rotatable shaft 106. The rotatable shaft 106 is supported at its non-driven end by a bearing 108.

A bearing 110 is located between the rotor assembly 104 and the rotatable shaft 106 and supports the rotor assembly 104 in the radial and axial directions. It will be readily appreciated that the rotor assembly 104 is not fixedly mounted to the rotatable shaft 106 and no torque is transferred directly from the rotatable shaft to the rotor assembly. The bearing 110 allows relative torsional rotation between the rotor assembly 104 and the rotatable shaft 106. The rotor assembly 104 is concentric with the rotatable shaft 106 and is mounted for rotation within the stator assembly 102.

An integrated torsional vibration damper (TVD) 200 consists of a torsional elastic coupling 202 of the type shown in FIGS. 1 to 3 and a torsional elastic damper 204 of the type shown in FIGS. 4 to 6.

The flange part 6 of the primary member 2 of the coupling 202 is mechanically secured to the crankshaft (not shown) of a diesel engine, for example. The secondary member 4 of the coupling 202 is mechanically secured to the primary member 20 of the damper 204.

The primary member 20 of the damper 204 is mechanically secured to the driven end of the rotatable shaft 102 by means of a flange 112. Torque from the crankshaft (not shown) of the diesel engine is transferred to the driven end of the rotatable shaft 106 by means of the elastically connected primary and secondary members 2, 4 of the coupling 202, the primary member 20 of the damper 204 and the flange 112. Torsional vibrations between the crankshaft (not shown) of the diesel engine and the rotatable shaft 106 are therefore damped by the coupling 202.

The secondary member 22 of the damper 204 is mechanically secured to an end of the rotor assembly 102 by means of a flange 114. However, in some arrangements the flange 114 can be omitted such that the rotor assembly 102 is connected directly to the secondary member 22 of the damper 204. Torque from the crankshaft (not shown) of the diesel engine is transferred to the driven end of the rotor assembly 104 by means of the elastically connected primary and secondary members 2, 4 of the coupling, the elastically connected primary and secondary members 20, 22 and the flange 114. Torsional vibrations between the rotatable shaft 106 and the rotor assembly 104 are therefore damped by the damper 204.

A coolant fluid such as MIDEL and its equivalents is circulated along a coolant circuit provided by passageways 116a, 116b in the rotatable shaft 106. The coolant fluid is supplied to, and removed from, the rotatable shaft 106 through a collar assembly 118. At the driven end of the rotatable shaft 106 the coolant fluid is supplied into the coupling 202 and damper 204 of the integrated TVD 200 through openings provided in the flange 112. The coolant fluid is therefore circulated through the damping chambers 18, 34 provided in the intermediate parts 12, 26 of the coupling and damper, respectively, where it acts as the viscous working fluid for the integrated TVD 200. It is advantageous to use coolant fluid instead of engine oil circulated from the diesel engine because it has a lower operating temperature (about 40° C. as opposed to about 80° C. for engine oil) and it does not contain contaminant particles. The absence of any contaminant particles will reduce the amount wear in the integrated torsional vibration assembly and increase its reliability. However, if the generator 100 is air-cooled then engine oil can be circulated from the diesel engine in the usual way.

The flow of coolant fluid (or engine oil) within the integrated TVD 200 can be controlled to change the level of damping that is applied to the rotatable shaft 106 by the integrated TVD. This can be achieved using any suitable flow restriction valves, control orifices or actuators (not shown) employing mechanical or electronic control. The flow restriction valves can be located within the integrated TVD in the case where the rotor assembly is cooled by a circulating coolant fluid such as MIDEL and either internally or externally of the generator where the rotor assembly is air-cooled. Internally fitted flow restriction valves will typically be controlled mechanically (e.g. using thermostatic, centrifugal speed and pressure control methods), but they can also be controlled electronically by providing control signals to the flow restriction valves using either wireless or wired arrangements (e.g. using slip rings). Externally fitted flow restriction valves will typically be controlled electronically by providing control signals from a diesel engine controller or generator controller as appropriate.

By adding controlled radial spring stiffness and damping rates the integrated TVD 200 can be used as a tuned mass damper to control the critical speed frequencies of the rotatable shaft.

Although the integrated TVD 200 has been explained above in the context of a generator, it will be readily appreciated that the rotating electrical machine can be a motor such that the flange 6 of the coupling 202 is mechanically secured to a driven load such as the propeller shaft of a marine propulsion motor, for example.

What is claimed is:

1. A rotating electrical machine comprising:
 a rotatable shaft;
 a rotor assembly concentric with the rotatable shaft and having a first end and a second end; and
 a viscous torsional vibration damper that employs a viscous working fluid to provide mechanical damping, the torsional vibration damper including a damper having a primary member adapted to be mounted to the rotatable shaft and a secondary member elastically connected to the primary member by one or more spring sets and adapted to be mounted to the first end of the rotor assembly;
 wherein the rotor assembly is not fixedly mounted directly to the rotatable shaft such that torsional vibrations between the rotatable shaft and the rotor assembly are damped by the damper.

2. The rotating electrical machine of claim 1, further comprising a bearing between the rotor assembly and the rotatable shaft.

3. The rotating electrical machine of claim 1, further comprising a coolant circuit through which a coolant fluid is circulated, wherein the viscous working fluid is the coolant fluid.

4. The rotating electrical machine of claim 1, wherein the torsional vibration damper is fixedly mounted to the rotatable shaft.

5. The rotating electrical machine of claim 1, wherein the torsional vibration damper is mounted to the rotatable shaft by a spring and damper mechanism to form a tuned mass damper.

6. The rotating electrical machine of claim 1, wherein the primary member of the damper is further adapted to be mounted to a driving shaft of a prime mover or a driven load.

7. The rotating electrical machine of claim 1, wherein the torsional vibration damper includes a coupling having a primary member adapted to be mounted to a driving shaft of a prime mover or a driven load and a secondary member elastically connected to the primary member by one or more spring sets.

8. The rotating electrical machine of claim 7, wherein the primary member of the damper is further adapted to be mounted to the secondary member of the coupling.

9. The rotating electrical machine of claim 1, further comprising a stator assembly.

10. A generator set comprising:
 (a) a rotating electrical machine including:
  a rotatable shaft;
  a rotor assembly concentric with the rotatable shaft and having a first end and a second end; and
  a viscous torsional vibration damper that employs a viscous working fluid to provide mechanical damping, the torsional vibration damper including a damper having a primary member adapted to be mounted to the rotatable shaft and a secondary member elastically connected to the primary member by one or more spring sets and adapted to be mounted to the first end of the rotor assembly;
  wherein the rotor assembly is not fixedly mounted directly to the rotatable shaft such that torsional vibrations between the rotatable shaft and the rotor assembly are damped by the damper; and
 (b) a prime mover adapted to apply a torque to the rotatable shaft of the electrical machine by means of the torsional vibration damper.

11. A motor set comprising:
 (a) a rotating electrical machine including:
  a rotatable shaft;
  a rotor assembly concentric with the rotatable shaft and having a first end and a second end; and
  a viscous torsional vibration damper that employs a viscous working fluid to provide mechanical damping, the torsional vibration damper including a damper having a primary member adapted to be mounted to the rotatable shaft and a secondary member elastically connected to the primary member by one or more spring sets and adapted to be mounted to the first end of the rotor assembly;

wherein the rotor assembly is not fixedly mounted directly to the rotatable shaft such that torsional vibrations between the rotatable shaft and the rotor assembly are damped by the damper; and (b) a driven load adapted to receive a torque from the rotatable shaft of the electrical machine by means of the torsional vibration damper.

* * * * *